United States Patent
Lu et al.

(10) Patent No.: US 12,069,528 B2
(45) Date of Patent: Aug. 20, 2024

(54) TELECOMMUNICATIONS NETWORK BEARER ALLOCATION AND DEALLOCATION

(71) Applicant: T-Mobile USA, Inc., Bellevue, WA (US)

(72) Inventors: Kun Lu, Bellevue, WA (US); Boris Antsev, Bothell, WA (US); Terri L. Brooks, Prosper, TX (US); Egil Gronstad, Encinitas, CA (US); John Humbert, Roeland Park, KS (US); Alan Denis MacDonald, Bellevue, WA (US); Salvador Mendoza, Issaquah, WA (US); Scott Francis Migaldi, Cary, IL (US); Gary Jones, Montgomery, TX (US); Christopher H. Joul, Bellevue, WA (US); Jun Liu, Issaquah, WA (US); Ming Shan Kwok, Seattle, WA (US); Karunakalage Viraj Rakitha Silva, Renton, WA (US); Neng-Tsann Ueng, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 441 days.

(21) Appl. No.: 17/397,758

(22) Filed: Aug. 9, 2021

(65) Prior Publication Data

US 2022/0046505 A1 Feb. 10, 2022

Related U.S. Application Data

(63) Continuation-in-part of application No. 16/047,131, filed on Jul. 27, 2018, now Pat. No. 11,089,527.

(Continued)

(51) Int. Cl.
*H04W 36/14* (2009.01)
*H04W 28/02* (2009.01)
*H04W 36/00* (2009.01)

(52) U.S. Cl.
CPC ....... *H04W 36/14* (2013.01); *H04W 28/0268* (2013.01); *H04W 36/0027* (2013.01)

(58) Field of Classification Search
None
See application file for complete search history.

(56) References Cited

U.S. PATENT DOCUMENTS

2013/0012211 A1* 1/2013 Sander ............ H04W 36/00224
455/450
2014/0080459 A1* 3/2014 Taha ................. H04W 52/0209
455/574

(Continued)

FOREIGN PATENT DOCUMENTS

EP 3300288 A1 3/2018
WO WO2005084061 A1 9/2005

(Continued)

OTHER PUBLICATIONS

Partial European Search Report mailed Jul. 30, 2021 for European Patent Application No. 19741440.2, 13 pages.

(Continued)

*Primary Examiner* — Phirin Sam
(74) *Attorney, Agent, or Firm* — Lee & Hayes, P.C.

(57) ABSTRACT

An access network can allocate a bearer for a network service associated with a quality-of-service (QoS) value (QV) and a retention-priority value (RPV), and determine a bearer ID for the service based on the QV, the RPV, and a supplemental priority value (SPV) different from the QV and from the RPV. Upon handover of a terminal, session(s) carried by a bearer allocated by the terminal can be terminated. That bearer can be selected using IDs of the bearers (Continued)

and a comparison function that, given two bearer IDs, determines which respective bearer should be terminated before the other. Upon handover of a terminal to an access network supporting fewer bearers per terminal than the terminal has allocated, a network node can select a bearer based on respective QVs and RPVs of a set of allocated bearers. The network node can deallocate the selected bearer.

20 Claims, 9 Drawing Sheets

Related U.S. Application Data

(60) Provisional application No. 62/710,402, filed on Feb. 16, 2018, provisional application No. 62/618,534, filed on Jan. 17, 2018.

(56) References Cited

U.S. PATENT DOCUMENTS

| | | |
|---|---|---|
| 2014/0206361 A1 | 7/2014 | Centonza et al. |
| 2014/0211619 A1 | 7/2014 | Suryavanshi et al. |
| 2015/0063101 A1 | 3/2015 | Touati et al. |
| 2015/0195748 A1* | 7/2015 | Uchino ............. H04W 36/0011 370/331 |
| 2015/0373584 A1* | 12/2015 | Hong ................... H04W 72/04 370/329 |
| 2016/0262073 A1* | 9/2016 | Muley .................. H04M 15/66 |
| 2016/0338130 A1* | 11/2016 | Park ...................... H04W 76/12 |
| 2019/0020688 A1* | 1/2019 | Miao .................... H04L 63/205 |
| 2019/0037461 A1* | 1/2019 | Li ......................... H04W 36/08 |
| 2019/0037629 A1* | 1/2019 | Ryu ...................... H04W 76/27 |
| 2019/0166580 A1* | 5/2019 | Prasad ................. H04W 72/30 |
| 2019/0223070 A1 | 7/2019 | Lu et al. |
| 2020/0267617 A1 | 8/2020 | Larsen et al. |
| 2020/0280875 A1* | 9/2020 | Kim ................. H04W 28/0289 |
| 2021/0289335 A1* | 9/2021 | Mochizuki ............. H04L 5/001 |

FOREIGN PATENT DOCUMENTS

| | | |
|---|---|---|
| WO | WO2010048577 | 4/2010 |
| WO | WO2012095114 | 7/2012 |
| WO | WO2014158084 A1 | 10/2014 |
| WO | WO2016046698 | 3/2016 |
| WO | WO2016190641 A1 | 12/2016 |

OTHER PUBLICATIONS

ETSI TS 123 203 v14.5.0, Digital cellular Telecommunications System, Oct. 2017, pp. 18, 28-30, 35-39, 47-55, 57-58, 65, 102, 108-109, 130-132, and 171-179.
ETSI TS 124 007 v13.0.0, Digital Cellular Telecommunications System, Mar. 2016, pp. 19-31, and 102-105.
ETSI TS 136 331 v13.1.0, LTE; Evolved Universal Terrestrial Radio Access(E-UTRA), Apr. 2016, pp. 25-29, 45-46, and 78-79.
Larsen, et al., "U.S. Appl. No. 62/455,696", filed Feb. 7, 2017, 2017, 26 pgs.
Office Action for U.S. Appl. No. 16/047,131, mailed on Oct. 16, 2020, Lu, "Telecommunications Network Bearer Allocation and Deallocation", 12 Pages.
PCT Search Report and Written Opinion mailed on May 1, 2019 for PCT Application No. PCT/US2019/014011, 11 pages.
The LTE Network Architecture, Alcatel Lucent White Paper, Dec. 2, 2009, pp. 1, 8-11.
European Search Report mailed Nov. 2, 2021 for European Patent Application No. 19741440.2, 11 pages.

* cited by examiner

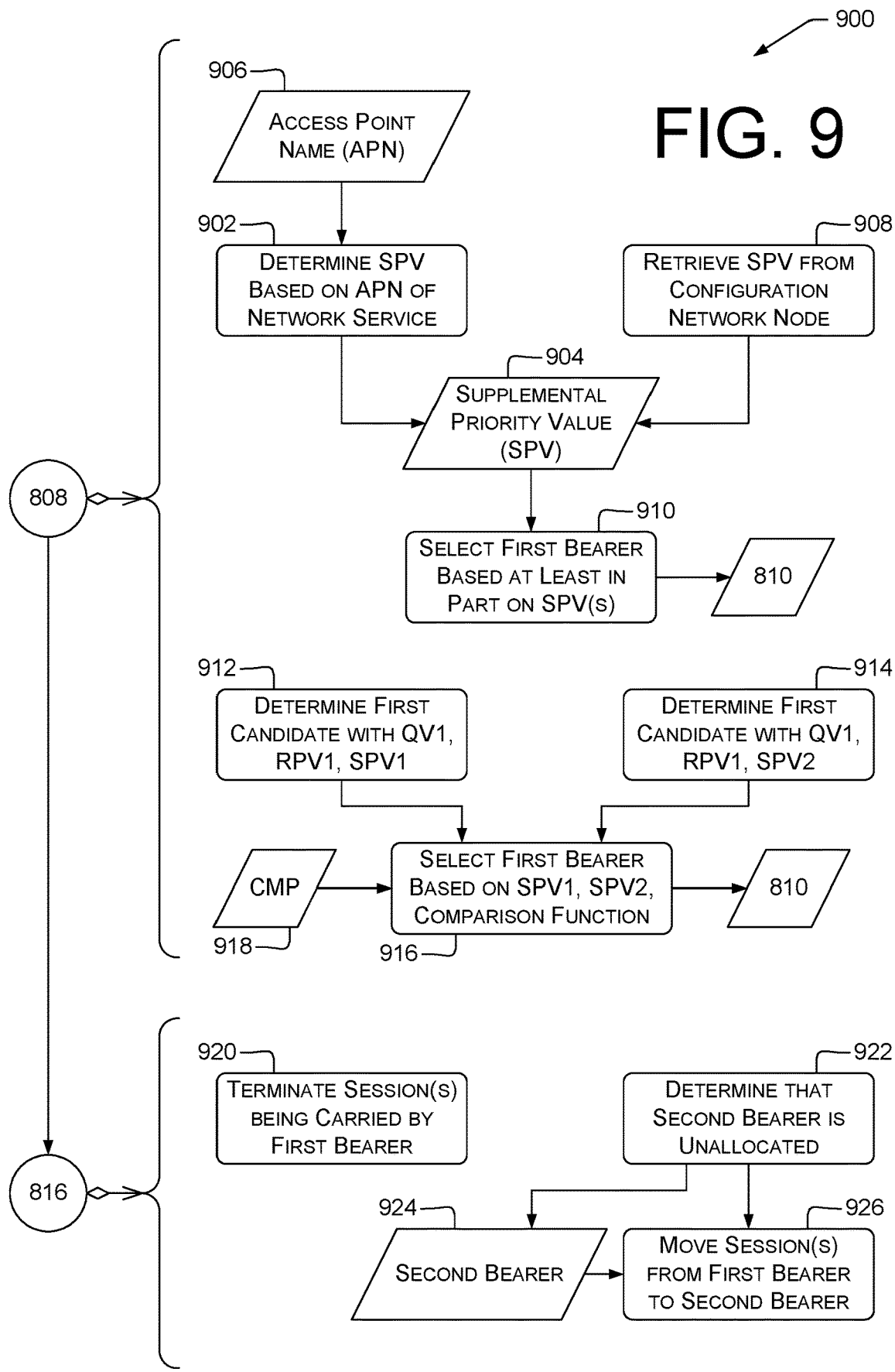

TELECOMMUNICATIONS NETWORK BEARER ALLOCATION AND DEALLOCATION

CROSS-REFERENCE TO RELATED APPLICATION

This application is a continuation of and claims priority to U.S. patent application Ser. No. 16/047,131, filed Jul. 27, 2018, titled "Telecommunications Network Bearer Allocation and Deallocation," which is a nonprovisional application of, and claims priority to and the benefit of, both U.S. Patent Provisional Application Ser. No. 62/618,534, filed Jan. 17, 2018, and entitled "APN Based Prioritization in eRAB Removal Selection when Moving from Higher Supporting DRBs to Lower Supporting DRBs In LTE," and U.S. Patent Provisional Application Ser. No. 62/710,402, filed Feb. 16, 2018 and entitled "APN based prioritization in erab removal selection when from higher supporting DRBS to lower supporting DRBS in LTE", the entirety of all which are incorporated herein by reference.

BACKGROUND

Modern telecommunications networks such as cellular telephone networks can support a variety of types of session, such as voice, video, or messaging. Second-generation (2G) and third-generation (3G) cellular networks such as Global System for Mobile Communications (GSM) networks or Universal Mobile Telecommunications System (UMTS) networks generally carry streaming media over circuit-switched (CS) connections. Fourth-generation (4G) cellular networks such as Long Term Evolution (LTE) (including LTE-Advanced) networks and fifth-generation (5G) cellular networks such as the 3GPP 5G System generally carry streaming media over packet-switched (PS) connections. Many cellular carriers operate wireless access networks spanning multiple technology generations due to the substantial infrastructure investment needed to expand cellular networks. Due to differences in network deployment and the radio environment, a terminal may sometimes hand over from a higher-generation access network to a lower-generation access network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

FIG. 9 illustrates example bearer-selection and bearer-set pruning processes performed in a telecommunications network.

DETAILED DESCRIPTION

Overview

Figure 1:
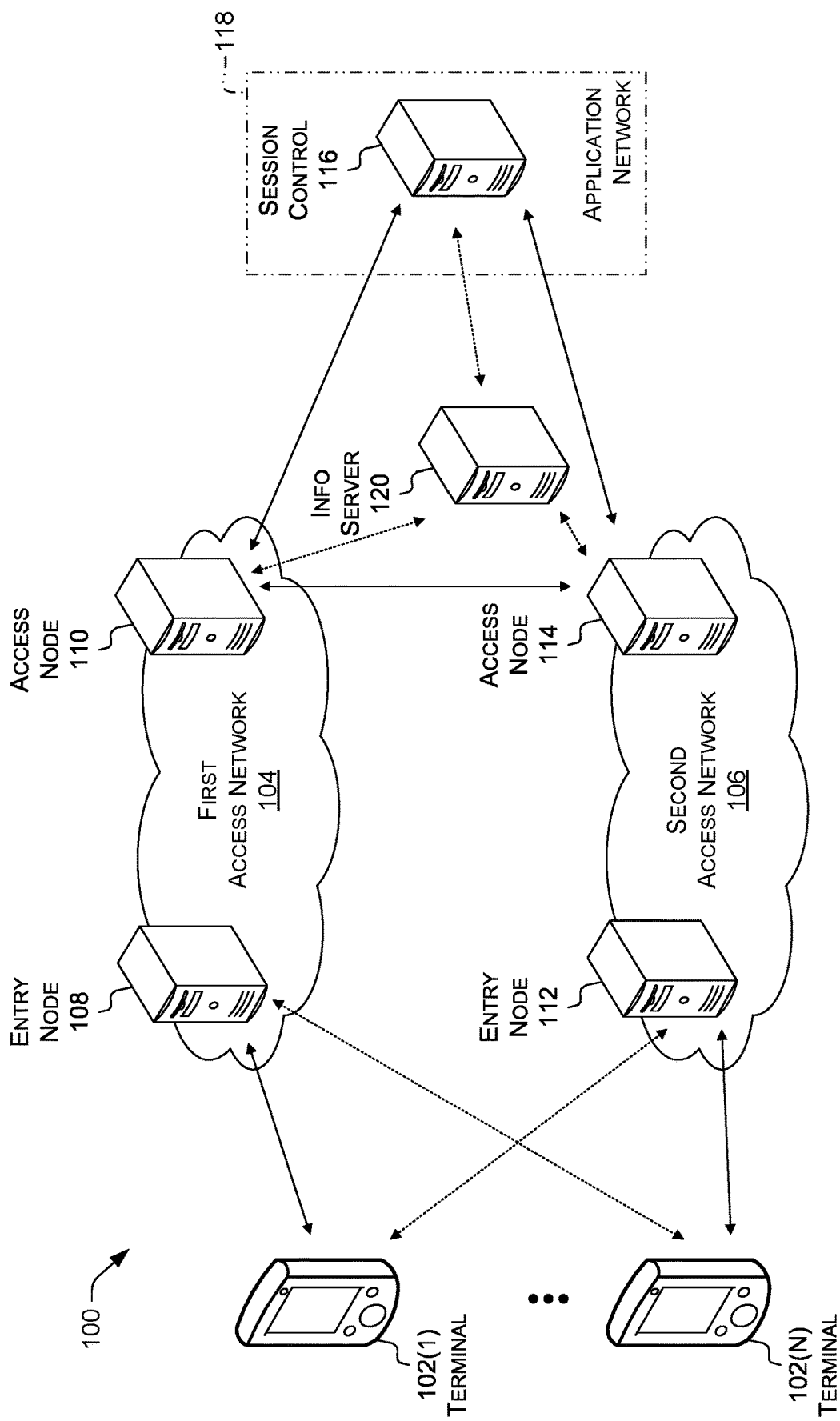
FIG. 1 illustrates an overview of nodes and devices involved in bearer selection for a terminal.

This disclosure describes, in part, a telecommunications network configured to implement bearer selection for bearers used by a terminal. Bearer selection can include assignment or management of bearers, e.g., when they are created or terminated, or at handover or other changes of state of a terminal. A bearer is an identified logical connection for conveying data in a manner determined by the bearer. For example, a bearer can have particular Quality of Service (QoS) or throughput (bits per second, bps) characteristics. A terminal can have one or more bearers open concurrently via a single radio connection.

Examples of bearers can include, in LTE, data radio bearers (DRBs) between the terminal and an eNodeB, S1 bearers between the eNodeB and a Serving Gateway (S-GW), or Evolved Universal Terrestrial Radio Access Network (E-UTRAN) Radio Access Bearers (E-RABs) between the terminal and the S-GW. Other examples of bearers can include 3GPP 5G DRBs between a terminal and a gNodeB, 5G NG-C bearers between a gNodeB and an Access Management Function (AMF), or 5G NG-U bearers between a gNodeB and a User Plane Function (UPF). A bearer via one or more network(s) between a first node or device and a second node or device can include or consist of other bearers, each spanning part of a path through the network between the first node or device and the second node or device. For example, an E-RAB can include or consist of a DRB and a corresponding S1 bearer. In some examples, a bearer can carry a service data flow (SDF, 3GPP 23.203) having defined flow characteristics, or an aggregate of SDFs. In some examples, a bearer carries traffic for a particular packet data network (PDN), e.g., the Internet or an Internet Protocol (IP) Multimedia Subsystem (IMS), and that traffic includes multiple SDFs, e.g., one for email and another for streaming video.

In some examples, a first access network can support one number of bearers per terminal, and a second, different access network can support fewer bearers per terminal. During handover from the first access network to the second access network, some of the bearers allocated while attached to the first access network will be terminated ("dropped" or "deallocated"). In some prior schemes, the selection of which bearers are dropped is not correlated with priority values of those bearers (e.g., network-defined priority values or user-assigned priority values). Since bearer selection is not correlated with priority values, bearer dropping may result in a streaming-media session being terminated or another negative user experience. In some examples herein, bearer selection permits retaining higher-priority bearers during handover, which can reduce the probability of a negative user experience. In some examples herein, bearer selection permits retaining more active bearers, e.g., by terminating Short Message Service (SMS) or other asynchronous, low-volume bearers. This can reduce the probability of loss of data and negative effects on the user experience.

Bearer selection can be performed at the time of bearer allocation, e.g., periodically or when the terminal requests a network service, or at the time of deallocation, e.g., due to handover. Bearer selection can be based on the service(s) or mix of service(s) that a terminal is currently using or wishes to use. Reducing the number of bearers in use (e.g., at the time of handover) is referred to herein for brevity as "pruning" the set of bearers in use.

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can be a device that includes a user interface (e.g., as does a smartphone), or can be a device that does not include a user interface. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein include a communications path for bidirectional exchange of data among two or more terminals. Example sessions include voice and video calls, e.g., by which human beings converse; data communication sessions, e.g., between two electronic systems or between an electronic system and a user-interface device in use by a human being; or a Rich Communication Suite (RCS) session. Sessions can be carried, e.g., by cellular or data networks, e.g., LTE or IEEE 802.11 (WIFI). Other examples of networks are discussed below.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.
Illustrative Telecommunications Network and Components FIG. 1 illustrates an example telecommunications network 100 and shows an overview of nodes and devices involved in provision of bearer-selection services to terminals. The telecommunications network 100 includes terminals 102(1)-102(N) (individually or collectively referred to herein with reference 102), N≥1. A terminal 102 may be or include a cellular phone or other type of terminal such as those described above. Terminal 102 can be configured to originate or receive communications sessions.

In some examples, terminal 102 can communicate, e.g., via a first access network 104 of a first class or a second access network 106 of a second, different class. Terminal 102 may participate in a handover between first access network 104 and second access network 106, e.g., as a user moves in and out of coverage areas of individual access networks 104 or 106. A single-connectivity (or single-radio, SR) terminal 102 can communicate via one access network 104, 106 at a time. A dual-connectivity (dual-radio, DR) terminal 102 can communicate concurrently via both access network 104 and access network 106, as shown by the stippled lines. Some examples herein relate to SR terminals 102.

Classes can relate to types of network (e.g., PS vs. CS) or to service levels provided by networks to a subscriber. The term "class" does not imply that either of the first class or the second class is superior to the other. Examples of a first class and a second, different class are given in Table 1. In some examples, the class of a network depends on the subscriber or terminal 102. For example, a particular subscriber or terminal 102 may only be authorized to use a certain number of bearers on second access network 106, even if second access network 106 permits other subscribers or terminals 102 to use more than the certain number of bearers.

TABLE 1

| First Class | Second Class |
| --- | --- |
| 5G new radio (NR) (>8 bearers) | LTE R14 and below (8 bearers) |
| LTE R15 (15 bearers) | LTE R14 and below (8 bearers) |
| Full cell (LTE or 5G) (≥8 bearers) | Microcell/nanocell/picocell (<8 bearers, e.g., 4 bearers) |
| 5G or LTE R15 (>8 bearers) | Microcell (5G or LTE) (≤8 bearers) |
| Unrestricted (N bearers) | Restricted, e.g., by subscriber or terminal 102 (<N bearers) |
| 3GPP access (5G or LTE) (>3 bearers) | Non-3GPP access (e.g., public WIFI access point) (≤3 bearers, e.g., for IMS signaling, VoLTE media, and Internet, respectively) |

In the illustrated example, first access network 104 includes a first entry node 108, e.g., a 5G gNodeB, and a first access node 110, e.g., a 5G Access and Mobility Management Function (AMF). Second access network 106 includes a second entry node 112, e.g., an LTE eNodeB, and a second access node 114, e.g., an LTE mobility management entity (MME). Other examples of access nodes include a GSM mobile switching center (MSC) server (MSS). Terminal 102 can communicate via the respective entry nodes 108, 112 with the respective access nodes 110, 114. The first access node 110 and the second access node 114 are examples of access nodes or devices that can control or modify communications with terminal 102 via access network(s) 104 or 106.

A handover between access networks can include, for example, a handover from packet-switched first access network 104 to circuit-switched second access network 106. However, handover is not limited to that example. For example, an SR terminal 102 can be handed over from a 5G access network to an LTE access network, or in general between a first access network of a first class and a second access network, e.g., of the first class or of a second, different class (e.g., PS to CS or vice versa). Example network classes may include cellular networks, WIFI networks carrying voice-over-Internet-Protocol (VoIP) communication sessions, wireline networks such as Ethernet, or wide-area networks such as those used for communications via satellites.

The terminal 102 can be configured to initiate or receive a communication session, such as a voice call, a video call, or another sort of synchronous communication. Initiation of such communications may involve communication clients and Session Initiation Protocol (SIP, RFC 3261) clients communicatively connected with components of the telecommunications network, e.g., session-control node 116. In various embodiments, the session-control node 116 represents components of an IMS core network. Session-control node 116 can be part of an application network 118, e.g., an IMS network or other network providing services to terminal 102. Application network 118 can also be referred to as an "upper-level" network that uses the services provided by access networks 104, 106 to communicate with terminals 102. Network 100 can include or be connected with any number of access networks 104, 106 or any number of application networks 118.

In some examples, access nodes 110, 114, or session-control node 116, can communicate with an information server 120 to retrieve information about terminals 102 or subscribers to the telecommunications network 100. For example, information server 120 can be or include an LTE HSS or HLR, or a 5G User Data Management (UDM) function or User Data Repository (UDR). Although shown as separate from access networks 104 and 106 and from application network 118, information server 120 can be part of any of those, or can communicate with ones of those of which it is or is not part, in various examples.

Each of the first access node 110, the second access node 114, and the session-control node 116, may each be or include a server or server farm, multiple, distributed server farms, a mainframe, a work station, a PC, a laptop computer, a tablet computer, an embedded system, or any other sort of device or devices. In one implementation, one or more of first access node 110, the second access node 114, and the session-control node 116 may represent a plurality of computing devices working in communication, such as a cloud-computing node cluster. Also, the first access node 110, the second access node 114, and the session-control node 116 may each be or include nodes or devices of a telecommunications network. Examples of such components are described below with reference to FIG. 2.

As noted above, SIP can be used to establish and manage communication sessions. SIP is an IP-based protocol, so terminal 102 exchanges SIP messages via an IP link with session-control node 116. To establish IP connectivity via a 5G access network 104, terminal 102 sends a Service Request message to access network 104, e.g., to a gNodeB of a 5G access network. The gNodeB communicates with the AMF to obtain an IP address for terminal 102. The gNodeB can also obtain other information, e.g., the IP address of a session-control node 116. Session-control node 116 can include, e.g., a P-CSCF via which terminal 102 can access IMS services. The gNodeB responds to terminal 102 with the requested information. Terminal 102 is then able to communicate via IP with session-control node 116 or other IP-connected nodes or devices.

Session-control services are generally provided by session-control node 116 independently of the class of access network(s) used for any particular communication session. This permits providing consistent session-control services between, e.g., PS and CS terminals, or throughout a communication session when one party leaves a PS coverage area and hands over to a CS access network. Similarly, access-network selection, a component of bearer selection, is generally performed with respect to the radio characteristics of each available access network 104, 106, without regard to the types of sessions for which the communication link will be used.

However, a terminal 102 communicating via one access network may be using more network resources, e.g., bearers, than another access network will support. Because of motion between cells, overload of cells, or other factors, terminal 102 may be required to change access networks at times not under the control of terminal 102. Terminal 102 may, therefore, not be able to deallocate bearers on its own initiative before handover. Some examples therefore deallocate bearers based at least in part on information about which services should be prioritized, e.g., from the user's standpoint.

In some examples, the first access network 104 or the second access network 106 may be any sort of access network, such as a GSM or UMTS network; a universal terrestrial radio network (UTRAN) or an Enhanced Data rates for GSM Evolution (EDGE) radio access network (GERAN); an E-UTRAN; a 3GPP 5G access network; a WIFI (IEEE 802.11) or other LAN access network; or a satellite or terrestrial wide-area access network such as a wireless microwave access (WIMAX) network. In some examples, the first access network 104 or the second access network 106 may include a base station (an eNodeB or gNodeB), as well as a radio network controller (RNC). In some examples, the first access network 104 or the second access network 106 may use any sort of air interface, such as a code division multiple access (CDMA), time division multiple access (TDMA), or frequency division multiple access (FDMA) air interface. In some examples, the first access network 104 may provided packet-switched connections and the second access network 106 may provide circuit-switched connections. In some examples, the first access network 104 may be a packet-switched cellular class of access network and the second access network 106 may be a packet-switched local-area-network class of access network. Examples of LAN access networks can include WIFI and IEEE 802.15.1 (BLUETOOTH). In some examples, access networks 104, 106 may include any network configured to transport IP packets, e.g., IPv4, IPv6, or any other evolution of an IP-based technology.

In some examples, a non-cellular network can carry voice traffic using VoIP or other technologies as well as data traffic, or a cellular network can carry data packets using HSPA, LTE, or other technologies, as well as voice traffic. Some cellular networks carry both data and voice in a packet-switched format. For example, many LTE networks carry voice traffic in data packets according to the voice-over-LTE (VoLTE) standard.

In some examples, wired access networks may be used, exclusively or in combination with wireless access networks. Examples of wired access networks include Plain Old Telephone Service, POTS, or Public Switched Telephone Network, PSTN, lines, optical (e.g., Synchronous Optical NETwork, SONET) technologies, Asynchronous Transfer Mode (ATM), and other network technologies, e.g., configured to transport IP packets. In some examples, the telecommunications network 100 can include, or be communicatively connected with, an interworking function (IWF) or other node or device configured to bridge networks, e.g., LTE, 3G, and POTS networks. In some examples, the IWF can bridge Signaling System 7 (SS7) traffic from the PSTN into the telecommunications network 100, e.g., permitting PSTN customers to originate sessions with cellular customers and vice versa.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include access nodes 110, 114. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, by changing routing information, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Figure 2:
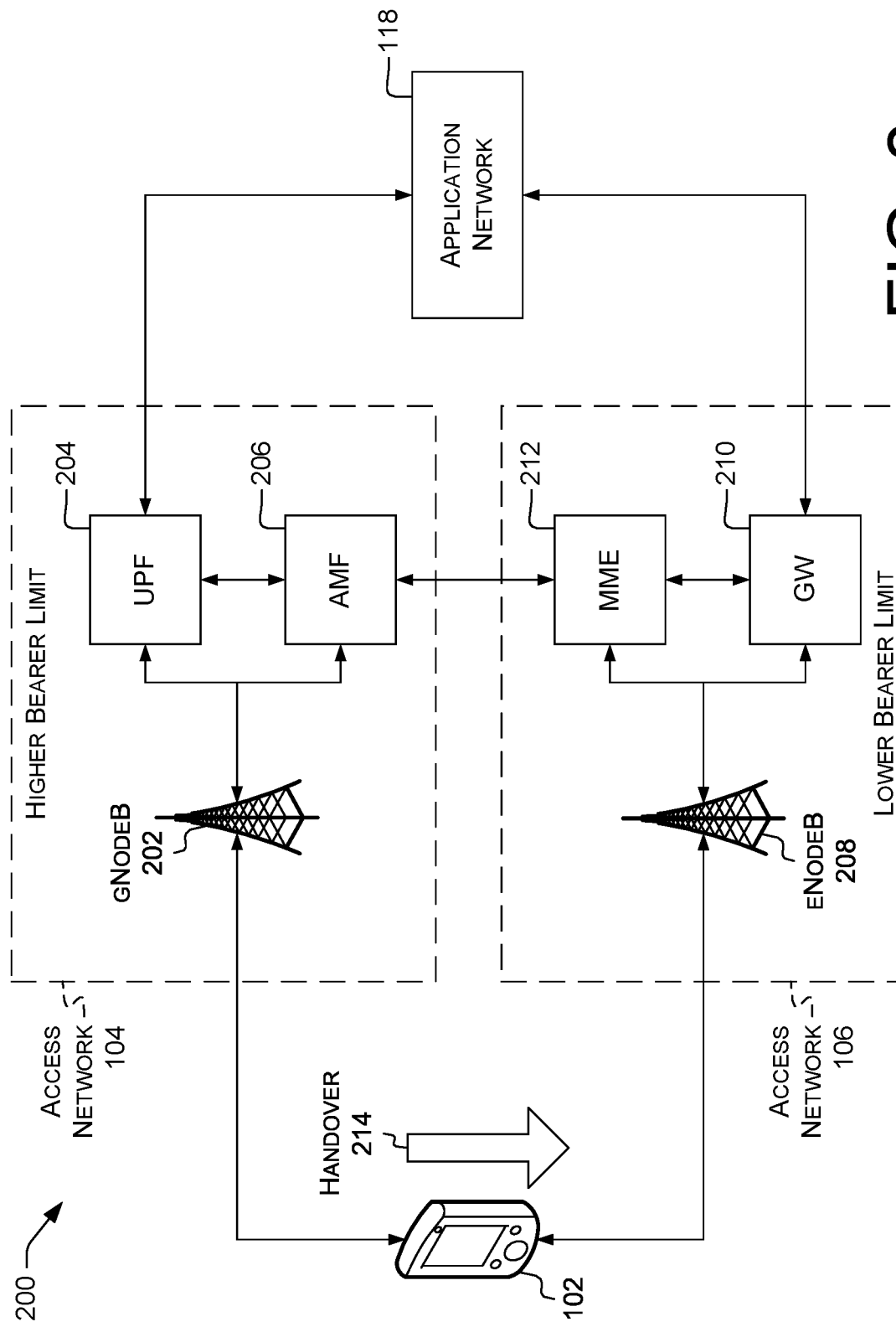
FIG. 2 illustrates an example telecommunications network, including multiple access networks to which a terminal can attach.

FIG. 2 illustrates an example telecommunications network 200. The illustrated blocks represent network functions that can be implemented as standalone device(s), or combined with other network functions into a single device or collection of device(s). The nodes, devices, and networks illustrated in FIG. 2 can be examples of the nodes, devices, and networks illustrated in FIG. 1 and described above. Accordingly, the descriptions of the nodes, devices, and networks of FIG. 1 apply to the nodes, devices, and networks of FIG. 2. Some examples herein, e.g., in FIGS. 2-9, are given in the context of an originating terminal 102. However, this is not limiting. Corresponding techniques and structures can additionally or alternatively be used with destination (or "terminating," "receiving") terminals 102.

Single-radio terminal 102 can attach to access networks 104 or 106 of the telecommunications network 200. In the example shown, access network 104 includes a 5G PS access network and access network 106 includes an LTE PS access network. 5G access network 104 includes a gNodeB 202 that provides connectivity to the 5G access network 104. The gNodeB 202 is connected with a user-plane function (UPF) 204 and with an AMF 206. LTE access network 106 includes an eNodeB 208, e.g., a 4G base station or other access point, that provides connectivity to the LTE access network 106. The eNodeB 208 is connected with a gateway 210 ("GW"), e.g., an LTE S-GW or PGW, and an MME 212. Terminal 102 can communicate with application network 118 via UPF 204 or GW 210. AMF 206 and MME 212 can communicate to carry out bearer selection in various examples described herein. For brevity herein, the term "entry node" refers to a gNodeB 202, eNodeB 208, WIFI access point (AP), or other network device that is the initial node that terminal 102 communicates with in order to access the services of a corresponding access network (e.g., a node that transmits radio signals to, or receives radio signals from, terminal 102).

The telecommunications network 200 may also include a number of devices or nodes not illustrated in FIG. 2. Nonlimiting examples of such devices or nodes include an ATGW, a serving GPRS support node (SGSN), a gateway GPRS support node (GGSN), a policy control rules function (PCRF) node, a session border controller (SBC), or a non-3GPP-access interworking function (N3IWF). Similarly, throughout this disclosure, other nodes or devices can be used in conjunction with listed nodes or devices. For example, a telecommunications network can include many core network nodes or devices, only some of which implement functions described herein for core network nodes or devices.

In the illustrated example, access network 104 can support a higher bearer count than access network 106. That is, terminal 102 can have more concurrent sessions established when connected to access network 104 than when connected to access network 106. During handover 214 of terminal 102 from access network 104 to access network 106, it is necessary to determine which bearers to drop (discontinue communications via) if more are active than access network 106 can support. Although FIG. 2 illustrates a handover from 5G to LTE, this is not limiting. Operations described herein with reference to gNodeB 202, UPF 204, AMF 206, eNodeB 208, GW 210, or MME 212 can be performed by nodes of networks of other types or classes, e.g., by entry node 108, a gateway of access network 104, access node 110, entry node 112, a gateway of access network 106, and access node 114, respectively.

In some prior schemes, bearers are allocated sequentially, e.g., by the LTE EPC. The lowest available bearer ID (in numerical order) is allocated when a network node or device, e.g., a terminal, requests a bearer. When a terminal moves to an area that supports fewer bearers than are currently in use by that terminal, the bearers with the numerically highest bearer IDs are dropped, e.g., bearers 9-15 when moving from a system capable of supporting 15 bearers to an access network capable of supporting only eight bearers. Since the bearers were allocated in the order they were requested, and the order of requests is not under the control of the network, the services that are affected by the dropped bearers may be different at every handover. For example, the bearers (e.g., active services) chosen to be dropped in this scenario may be inconsistent with regard to the priority of the services (higher-priority bearers may be dropped and lower-priority bearers retained). Various examples herein prioritize bearers so that the dropping of bearers is less likely to negatively affect the functioning of the terminal, e.g., the ability of the terminal to provide uninterrupted or substantially uninterrupted services that the user has requested.

Figure 3:
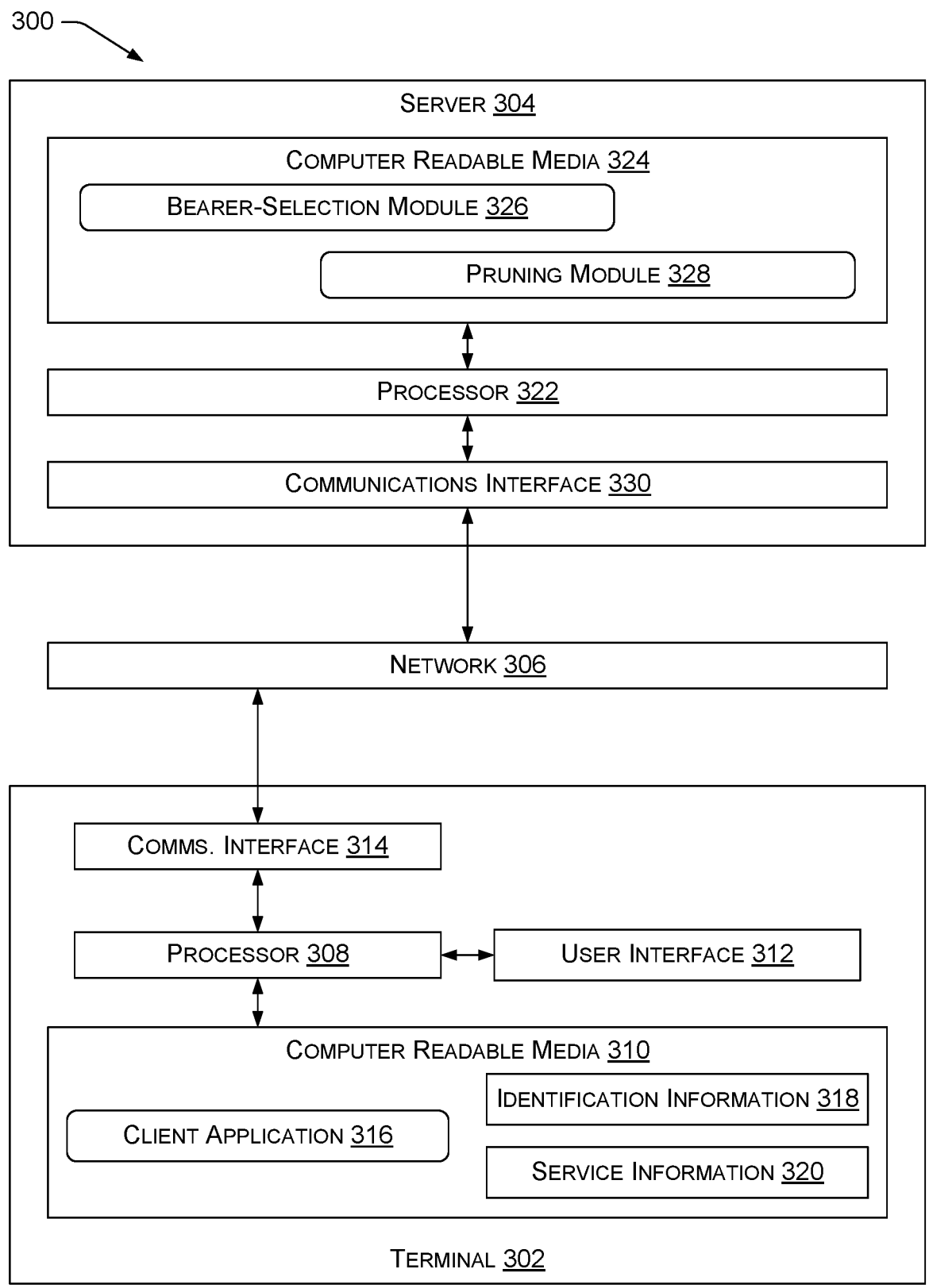
FIG. 3 is a block diagram illustrating components of a system that provides bearer selection according to some implementations.

FIG. 3 is a block diagram illustrating a system 300 permitting bearer selection according to some implementations. The system 300 includes a terminal 302 (which can represent terminal 102) communicatively connectable with a server 304 via a network 306. The server 304 can represent an access node 110 or 114, a session-control node 116, or another control system of a telecommunications network configured to perform functions described herein. Server 304 can be implemented using dedicated or shared (e.g., cloud) computing hardware. The network 306 can include one or more networks, such as a cellular network, e.g., 5G, or a non-cellular network, e.g., WIFI. Example network technologies are described above with reference to FIG. 1.

The terminal 302 can include one or more processors 308, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Terminal 302 can include one or more computer readable media (CRM) 310, such as semiconductor memory (e.g., random access memory (RAM), solid state drives (SSDs), or the like), disk drives (e.g., platter-based hard drives), another class of computer-readable media, or any combination thereof. The terminal 302 can further include a user interface (UI) 312, e.g., including an electronic display device, a speaker, a vibration unit, a touchscreen, or other devices for presenting information to a user and receiving commands from the user. The terminal 302 can further include one or more communications interface(s) 314, e.g., radio(s) or other network interface(s), configured to selectively communicate (wired or wirelessly) via the network 306, e.g., via an access network 104 or 106.

CRM 310 can be used to store data and to store instructions that are executable by the processors 308 to perform various functions as described herein. CRM 310 can store various classes of instructions and data, such as an operating system, device drivers, program modules, etc. The processor-executable instructions can be executed by the processors 308 to perform the various functions described herein. CRM 310 can be or include computer-readable storage media. Computer-readable storage media include, but are not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 308.

CRM 310 can include processor-executable instructions of a client application 316. The client application 316, e.g., a native or other dialer, can permit a user to originate and receive communication sessions, e.g., voice or Unstructured Supplementary Service Data (USSD), associated with the terminal 302. The client application 316 can additionally or alternatively include an SMS, RCS, or presence client, or a client of another telephony service offered by the server 304. For example, the client application 316 can communicate with entry nodes 108, 112 to allocate bearers for network services requested by terminal 102 or user thereof.

CRM 310 can store identification information 318 identifying the terminal 302. The identification information 318 can include, e.g., an IMEI of terminal 102 or an IMSI identifying the subscriber using terminal 302. CRM 310 can store credentials (omitted for brevity) used for access, e.g., to IMS or RCS services. In some examples, CRM 310 includes a Subscriber Identity Module (SIM) card providing secure credential storage. CRM 310 can store service information 320 relating to session types used by terminal 302, e.g., as discussed herein with reference to FIGS. 4-9. For example, service information 320 can include information of what QoS levels should be requested for what network services.

The server 304 can include one or more processors 322 and one or more CRM 324. CRM 324 can store processor-executable instructions of a bearer-selection module 326 or a pruning module 328. The processor-executable instructions of modules 326 and 328 can be executed by the one or more processors 322 to perform various functions described herein. In some examples, server 304 can be configured to, e.g., by executing the processor-executable instructions, perform functions described herein with reference to FIGS. 4-9.

In some examples, server 304 can communicate with (e.g., is communicatively connectable with) terminal 302 or other nodes or devices via one or more communications interface(s) 330, e.g., network transceivers for wired or wireless networks, or memory interfaces. Example communications interface(s) 330 can include Ethernet or FIBRE CHANNEL transceivers, WIFI radios, or DDR memory-bus controllers (e.g., for DMA transfers to a network card installed in a physical server 304). Communications interface(s) 314 can include any of the components described in this paragraph.

In some examples, processor 308 and, if required, CRM 310, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 322 with, if required, CRM 324.

Illustrative Operations

Figure 4:
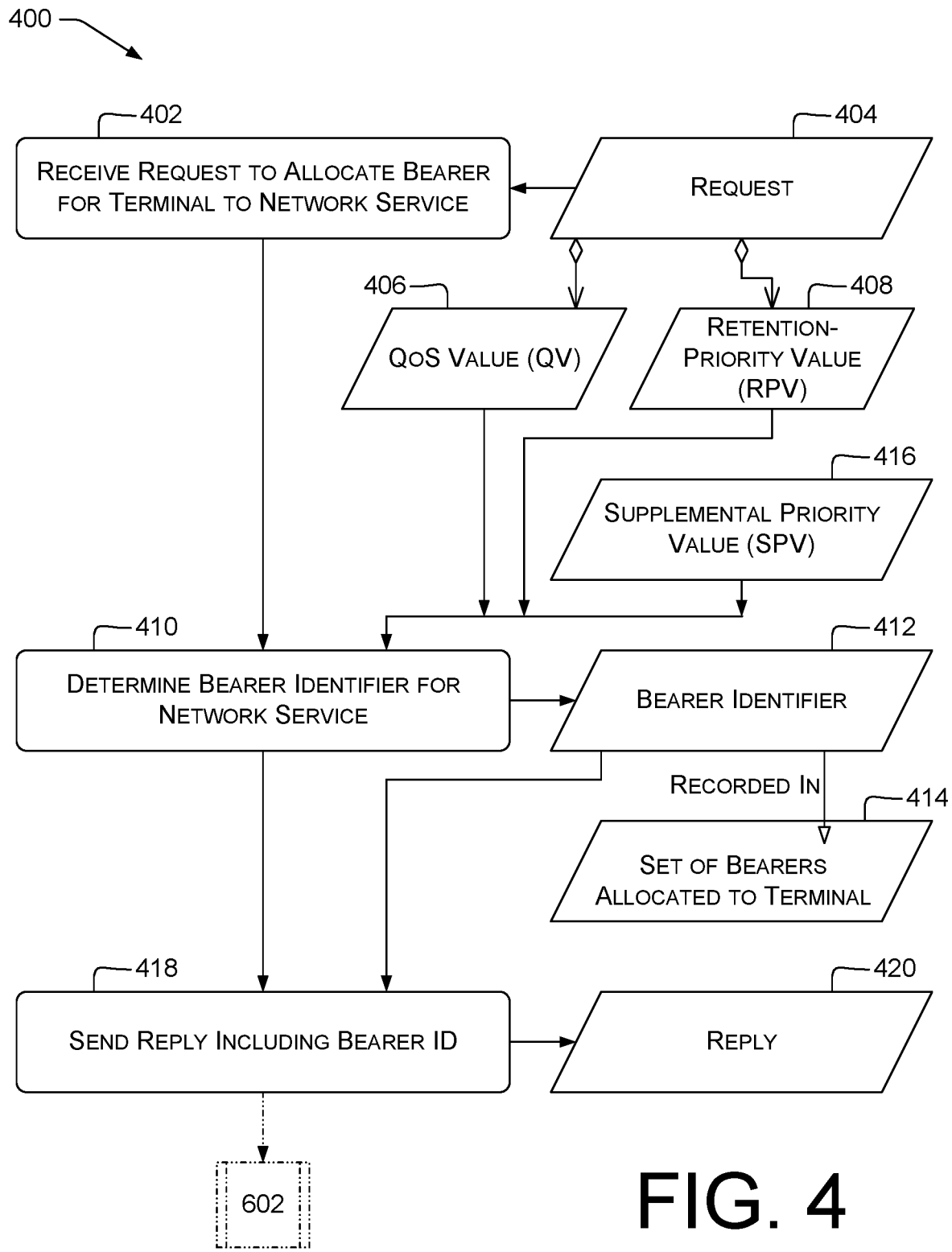
FIG. 4 illustrates an example bearer-selection process performed in a telecommunications network.

FIG. 4 is a dataflow diagram illustrating an example process 400 for bearer selection, and related data items. Process 400 can be performed, e.g., by a server 304 of a telecommunications network 100, e.g., including communications interface 330 and at least one processor 322. Server 304 can be or include, e.g,. an MME, PDN gateway (PGW), PCRF, AMF, or Session Management Function (SMF), or other access node 110, 114 or session-control node 116) In some examples, the server 304 includes control unit(s) configured to perform operations described below, e.g., in response to computer program instructions of the bearer-selection module 326.

Network 100 can include first wireless access network 104 (e.g., 5G) having a first entry node 108 (e.g., gNodeB 202) and a first access node 110 (e.g., AMF 206) communicatively connected with first entry node 108. Network 100 can also include second wireless access network 106 (e.g., LTE) having a second entry node 112 (e.g., eNodeB 208) and a second access node 114 (e.g., MME 212) communicatively connected with the second entry node 112 and with the first access node 110. In some examples, first wireless access network 104 is LTE and second wireless access network 106 is 5G, and the first access node 110 is an MME. Each of nodes 108, 110, 112, and 114 can be or include a server 304 or process(es) or module(s) running thereon, or other type(s) of control unit(s) to perform the listed functions.

Operations shown in FIG. 4 and in FIGS. 5-9, discussed below, can be performed in any order except when otherwise specified, or when data from an earlier step is used in a later step. For clarity of explanation, reference is herein made to various components shown in FIGS. 1-3 that can carry out or participate in the steps of the exemplary methods. It should be noted, however, that other components can be used; that is, exemplary method(s) shown in FIGS. 4-9 are not limited to being carried out by the identified components, and are not limited to including the identified operations or messages.

At 402, the control unit receives a request 404 to allocate a bearer. Request 404 indicates that terminal 102 will be able to use the bearer, once allocated, to receive a corresponding network service via first access network 104. The requested bearer can be, e.g., an LTE DRB, or a 5G call-flow identity. The network service is associated with a quality-of-service (QoS) value (QV) and a retention-priority value (RPV). In the illustrated example, request 404 includes data indicating the QV 406 and the RPV 408.

The QV 406 can include, e.g., an LTE QoS Class Identifier (QCI). QCIs can be used to define QoS for individual bearers. For example, voice can have QCI 1, IMS signaling QCI 5, and streaming packet data QCI 6. In some examples, QCI can be changed dynamically. The RPV 408 can include, e.g., an Allocation Retention Priority (ARP), which is a relative priority value. In some examples, all services for a given user (e.g., for a given terminal 102 at a particular time) share the same ARP (e.g., indicating that that user is a normal user or a priority user).

In some examples, each QCI has an associated priority level (23.203 v14.5.0, § 6.1.7.2). This standardized priority level is used for determining packet priority between SDFs when a network link, e.g., a radio link to terminal 102, cannot satisfy the QoS requirements of the currently active bearers. The QCI-associated priority level does not, alone, permit effectively selecting bearers to prune or retain. For example, terminal 102 may be embedded in a vehicle and have open a Vehicle-to-X (V2X) bearer of QCI-associated priority level 2.5 and a live-streaming video bearer of QCI-associated priority level 7, e.g., for a stream being watched by passengers in the vehicle. If the vehicle is on a lightly-loaded, rural road, the user experience will be degraded if the higher-priority-level V2X bearer is retained and the video bearer is pruned, even though the allocated V2X bearer is not actively exchanging data. Various examples herein can permit more effectively determining which bearers to prune.

Pruning bearers as described in various examples herein, e.g., based on data in addition to or instead of the QCI-associated priority level, can improve a user's experience with a terminal. Moreover, many users attempt to solve problems with their terminals by power-cycling those terminals. Therefore, reducing interruptions in the user's sessions can reduce the probability that the user will misattribute session interruptions to the terminal and power-cycle the terminal. The startup process for a terminal involves extra battery drain and extra network load during the network-discovery and initial-attach procedures, compared to standby or low-load operations. Consequently, various herein-described examples that improve bearer pruning can reduce the overall power consumption and network load of a group of terminals.

At 410, the control unit determines a bearer identifier (ID) 412 for the network service based at least in part on the QV 406 and the RPV 408 The bearer identifier can connote or denote a priority of the corresponding bearer. In some examples, as denoted by the open-headed arrow, the control unit further records the bearer assigned bearer ID 412 as part of a set 414 of bearers allocated by or to terminal 102.

For brevity, throughout this document, bearers with lower-valued bearer IDs 412 are described as having higher priority than bearers with higher-valued bearer IDs 412. Additionally or alternatively, higher bearer ID 412 values can connote or denote higher priority. Any deterministic relationship between bearer ID 412 values and relative bearer priority can be used. Examples are discussed below and with reference to blocks 502, 504, or 508, or Table 3.

Block 410 can include determining bearer ID 412 further based on at least one supplemental priority value (SPV) 416. SPV 416 is different from both the QV 406 and the RPV 408. In some examples in which QV 406 and the RPV 408 (e.g., QCI and ARP) do not together provide enough information to determine the relative priority of bearers (and thus the desired bearer ID 412 assignment), the SPV 416 can be used to do so. In some examples, the SPV 416 comprises at least one of any of the data items listed in Table 2.

TABLE 2

| Data Item |
|---|
| Access Point Name (APN) associated with the service |
| Priority flag (high/low priority), e.g., represented as a single bit or other Boolean value |
| Identification of a subscriber associated with the terminal 102, e.g., an International Mobile Subscriber Identity (IMSI), Mobile Subscriber International Subscriber Directory Number (MSISDN), or Subscriber Permanent Identifier (SUPI). |
| Type of the terminal 102 |
| Equipment identifier of the terminal 102, e.g., an an International Mobile Equipment Identity (IMEI) or Media Access Control (MAC) address |
| Network address allocated to the terminal 102, e.g., a MAC or IP address |
| Multimedia Priority Services (MPS) indication |
| Mission-Critical Services (MCS) indication |

At 418, the control unit sends a reply 420 comprising the bearer ID 412 via the communications interface 330. The reply 420 can be transmitted to terminal 102, entry node 108, or other devices or nodes of telecommunications network 100.

In some examples, after block 418, a handover may occur to access network 106. Entry node 112, or another node of access network 106, may need to reduce the number of bearers in use. Accordingly, some time after block 418, entry node 112 may perform block 602, FIG. 6 (shown in phantom). By virtue of the assignment of bearer ID 412 at block 410, the bearer with ID 412 has already been prioritized with respect to other bearers. Therefore, entry node 112 can deallocate the bearer with ID 412 (e.g., at block 710, 720, or 726) without having to determine bearer priority. This is discussed in more detail below with reference to FIGS. 6 and 7.

Figure 5:
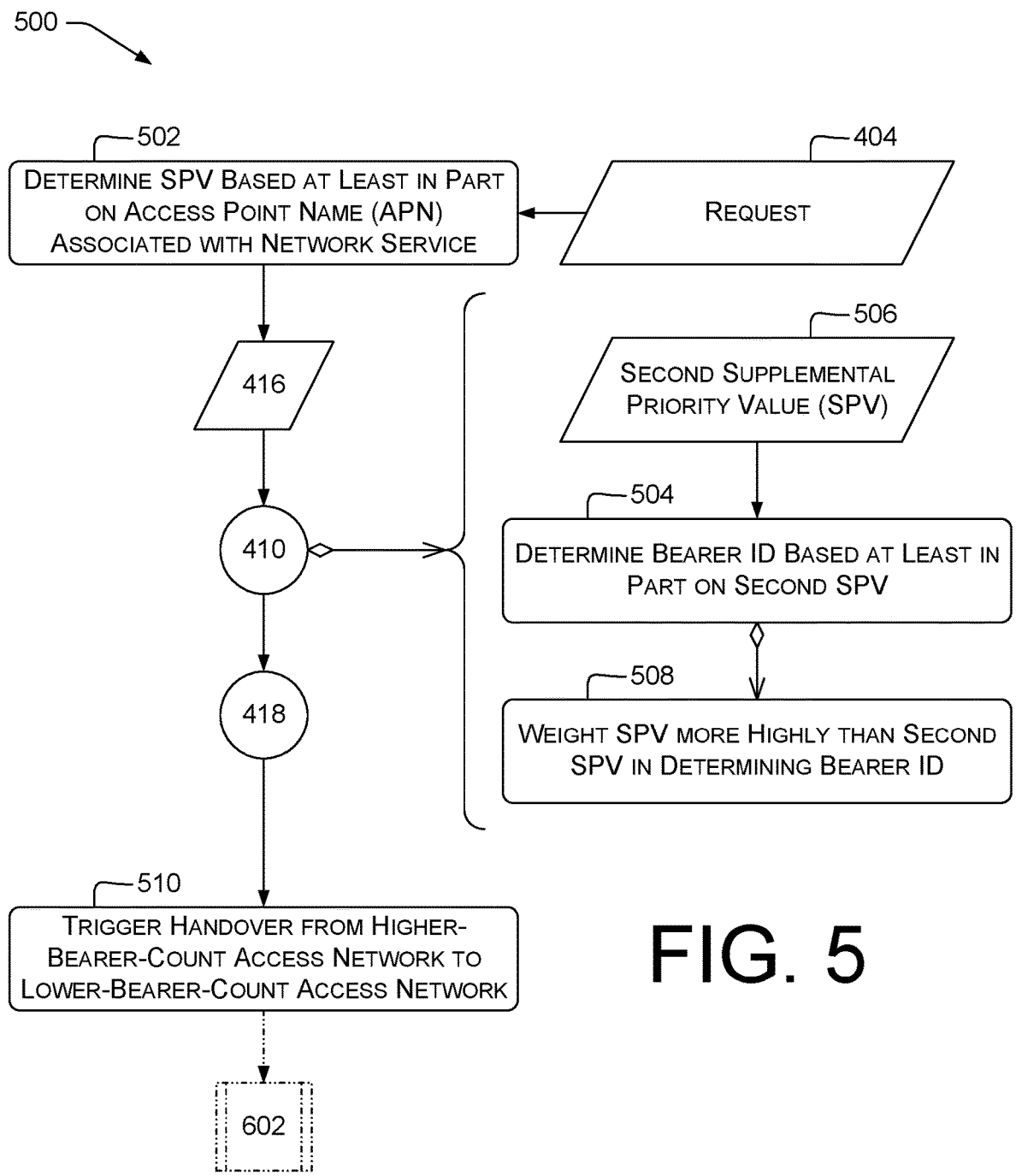
FIG. 5 illustrates example bearer-selection processes performed in a telecommunications network.

FIG. 5 illustrates an example process 500 performed by server(s) 304 of a telecommunications network 100 for assigning bearers. In some examples, server(s) 304 include control unit(s) configured to perform operations described below, e.g., in response to computer program instructions of the bearer-selection module 326. In some examples, block 410 can be preceded by block 502. In some examples, block 410 can include blocks 504 and 508.

At 502, the control unit determines the SPV 416 based at least in part on an APN associated with the service. For example, the control unit can determine a priority flag associated with the APN, e.g., using a lookup table stored at the server(s) 304 (e.g., an eNodeB, MME, or PGW), or in a PCRF or other network node. The control unit can then use the priority flag together with the QV 406 and RPV 408 to determine bearer ID 412. For example, IMS signaling and Internet data may have the same QV 406 and RPV 408, but they can be distinguished in priority by the SPV 416.

In some examples, as noted above, all services for a given user have the same RPV 408 (ARP). In some examples, at least two bearers in the set 414 of bearers have the same QCI. For example, QCI 6 can be used for both streaming video services and for Transmission Control Protocol (TCP)-based services such as email or RCS signaling. Various examples herein permit prioritizing, e.g., RCS signaling over streaming video, or vice versa, even if the bearers for both have the same QCI and ARP values. In an example or block 502 in which the streaming video is retrieved from the Internet (a first PDN) and the RCS signaling is exchanged with an IMS (a second PDN), the APNs of the two PDNs can be used to determine relative priority. Similarly, APNs or other SPVs 416 can be used to determine relative priority between Internet data and Multimedia Messaging Service (MMS) messages, both at QCI 6.

At 504, the control unit determines the bearer ID based at least in part on a second SPV 506. The second SPV 506 can include at least one of any of the data items described herein with reference to FIG. 4, e.g., those listed in Table 2. In some examples, the second SPV 506 is different from the SPV 416; the second SPV 506 is different from the QV 406; and the second SPV 506 is different from the RPV 408. In some examples, block 504 can include block 508.

At 508, the control unit weights the SPV 416 more highly than the second SPV 506 in determining the bearer ID. For example, the second SPV 506 can be used as a tiebreaker when the QV 406, RPV 408, and SPV 416 together do not provide enough information to assign a bearer ID 412.

At 510, the control unit triggers a handover of the terminal from first access network 104 supporting a first number of bearers to second access network 106 supporting a second, lower number of bearers. After block 510, block 602 can take place (shown in phantom). Handover can be triggered, e.g., by sending a network-initiated deregistration message to terminal 102; by sending a message to terminal 102 to adjust its signal-strength threshold(s); or otherwise as specified in the pertinent standards. Example signal-strength threshold(s) include those applicable to Received Signal Strength Indicator (RSSI) and Reference Signal Received Power (RSRP) measurements.

Figure 6:
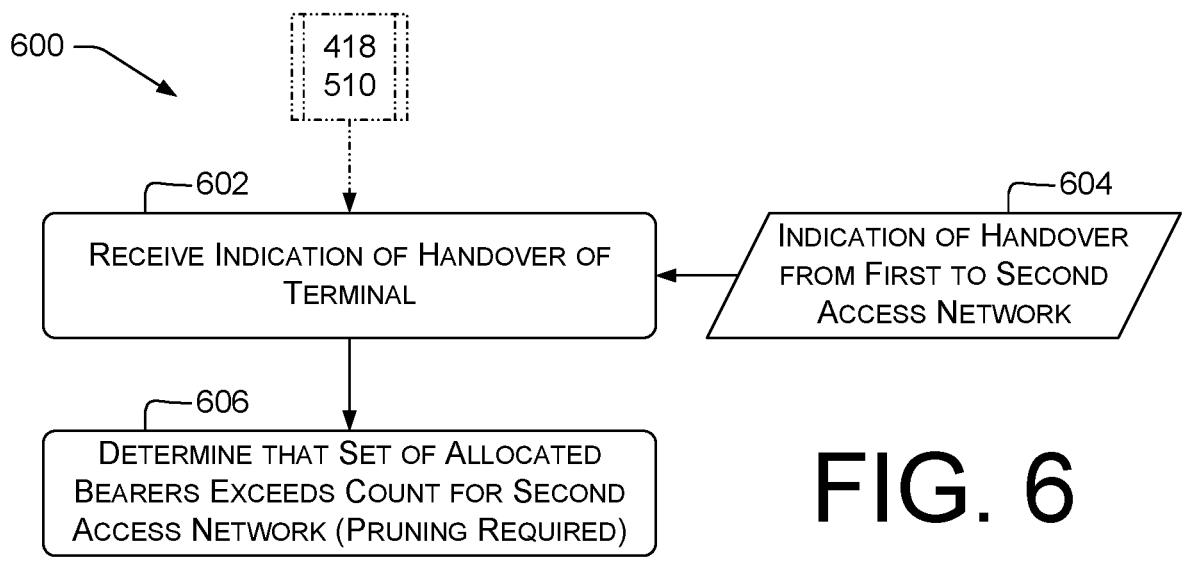
FIG. 6 illustrates an example bearer-set analysis process performed in a telecommunications network.

FIG. 6 is a dataflow diagram illustrating an example process 600 for bearer-set pruning, and related data items. Process 400 can be performed, e.g., by a server 304 (e.g., an eNodeB, gNodeB, or other entry node 108, 112) of a telecommunications network 100. The telecommunications network 100 can include components such as those described herein with reference to process 400. Server 304 can include communications interface 330 and at least one processor 322. In some examples, server 304 includes control unit(s) configured to perform acts described below, e.g., in response to computer program instructions of the pruning module 328. As noted by the phantom representation of blocks 418 and 510, block 602 can be performed chronologically after block 418 or block 510. Some examples herein include a system that performs the functions described herein with reference to both FIGS. 4 and 6; other examples herein include a first system that performs the functions described herein with reference to FIG. 4 and a separate system that performs the functions described herein with reference to FIG. 6.

At 602, the control unit receives an indication 604 of a handover of a terminal from a first access network 104 to a second access network 106. The control unit can be associated with the second access network 106. As noted above, in some examples, the first access network 104 supports a first number of bearers for the terminal 102, and the second access network 106 supports a second number of bearers for the terminal 102. The second number is less than the first number.

At 606, the control unit determines that the terminal has allocated a set of bearers comprising more bearers than the second number (e.g., set 414, FIG. 4). Therefore, the set of bearers in use by terminal 102 needs to be pruned.

Figure 7:
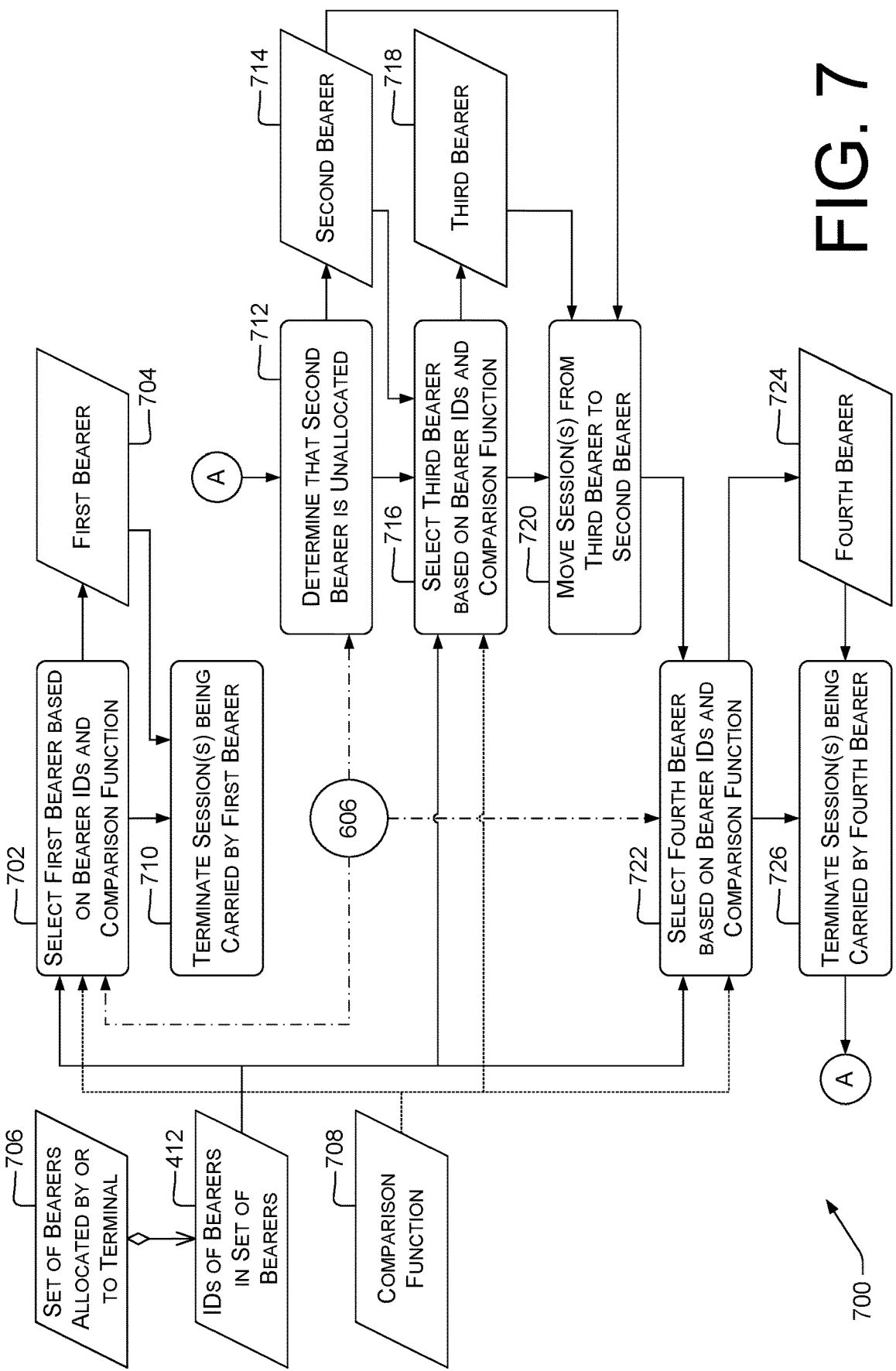
FIG. 7 illustrates example bearer-set pruning processes performed in a telecommunications network.

FIG. 7 illustrates an example process 700 performed by server(s) 304 of a telecommunications network 100 for pruning bearers. In some examples, server(s) 304 include control unit(s) configured to perform operations described below, e.g., in response to computer program instructions of the bearer-selection module 326 or pruning module 328. In some examples, as shown by the dash-dot lines, block 606 can be followed by any of blocks 702, 712, or 716.

At 702, the control unit selects a first bearer 704 of the set 706 of bearers allocated by or to terminal 102. Set 706 can represent set 414. The control unit selects the first bearer 704 based on respective bearer IDs 412 of the bearers in the set 706 of bearers. Therefore, the selection of the bearer IDs 412, e.g., at block 410, influences the selection of the first bearer 704.

The control unit also selects the first bearer 704 based on a predetermined comparison function 708. Comparison function 708 takes as input two different bearer IDs 412, and provides as output a determination of which of the two respective bearers should be terminated before the other or, in general, of which of the two respective bearers has priority over the other. For example, the control unit can select, as the first bearer 704, the bearer having the numerically highest bearer ID 412. The use of comparison function 708 to compare two bearer IDs x and y does not imply that either x or y will necessarily be deallocated or otherwise manipulated. However, some examples using comparison function 708 or other comparison functions described herein will deallocate or otherwise manipulate one of x or y before the other, based on the result provided by the comparison function 708.

In some examples, comparison function 708 can embody a design decision of which bearer IDs 412 connote or denote higher-priority bearers, such as voice calls, and which bearer IDs 412 connote or denote lower-priority bearers, such as SMS bearers. Comparison function 708 can determine, for example, that a bearer having a respective ID 412 with a relatively higher numerical value (or session(s) being carried by that bearer) should be terminated before a bearer having a respective ID 412 with a relatively lower numerical value (or session(s) being carried by that bearer). Comparison function 708 can include any function in closed form that provides a deterministic partial order among the bearer IDs 412. Example comparison functions 708 are shown in Table 3. For convenience, without limitation, Python 3 notation is used in Table 3, and the two input bearer IDs 412 are denoted x and y. The example comparison functions 708 in Table 3 return the bearer ID having lower priority, e.g., the bearer that should be terminated before the other ("dropFirst," i.e., the first to be dropped of x and y). Additionally or alternatively, a comparison function 708 can return the bearer ID having higher priority, e.g., the bearer that should not be terminated before the other.

TABLE 3

| General description | Function |
| --- | --- |
| Lower IDs have higher priority | dropFirst = lambda x,y: x if x > y else y |
| Higher IDs have higher priority | dropFirst = lambda x,y: x if x < y else y |

At 710, the control unit terminates session(s) being carried by the first bearer 704. For example, the control unit can terminate the first bearer 704, and any session(s) being carried on the first bearer 704 will be terminated with it. Bearers can be terminated as described in the network standards governing access networks 104, 106. For example, bearers in LTE networks can be terminated using RRCConnectionRelease messages, specified in ETSI TS 136 331 v13.1.0, § 5.3.8. Block 710 can include advising peer node(s) or device(s) that the session(s) are being dropped, but this is not required. In some examples, block 710 only affects the first bearer 704 between terminal 102 and access networks 104, 106.

In some examples, it may be possible to move bearers instead of or in addition to terminating bearers. Some of these examples use blocks 712, 720, or 722, or 726.

At 712, the control unit determines that a second bearer 714 of the second access network 106 is unallocated. This can be done according to the network standards governing access network 106.

At 716, the control unit selects a third bearer 718 of the set 706 of bearers based at least in part on respective bearer IDs 412 of the bearers in the set 706 of bearers, and the predetermined comparison function 708. For example, the control unit can select a third bearer 718 that should be retained, e.g., because it is associated with a priority APN, but that would normally be terminated based solely on its bearer ID. For example, when moving to a second access network 106 that only supports eight bearers (with IDs 412 1-8), the control unit can select any bearer with a bearer ID 412>8 as the third bearer 718 (or, similarly, as the first bearer 704 at block 702, or the fourth bearer 724 at block 722).

At 720, the control unit moves session(s) being carried by the third bearer to the second bearer. This can be done according to the network standards governing access networks 104, 106. For example, an LTE RRCConnectionReconfiguration procedure can be used to move the session(s).

At 722, the control unit selects a fourth bearer 724 of the set of bearers based on respective bearer IDs 412 of the bearers in the set 706 of bearers and the predetermined comparison function 708. Examples are discussed herein, e.g., with reference to block 702.

At 726, the control unit terminates session(s) being carried by the fourth bearer 724. Examples are discussed herein, e.g., with reference to block 710. Blocks 722 and 726 can be performed before, after, or in parallel with either or both of blocks 712 and 720. In the illustrated example, block 720 is followed by block 722, but that is not limiting. For example, block 726 can be followed by block 712 (connector "A").

Some examples herein permit rapidly determining which bearers to deallocate. In some examples, the processing required for bearer deallocation in the second access network is reduced, since the control unit can deallocate bearers, e.g., from highest to lowest in order by ID 412, without having to evaluate QVs 406, RPVs 408, or SPVs 416. This can reduce the time required for a handover.

Figure 8:
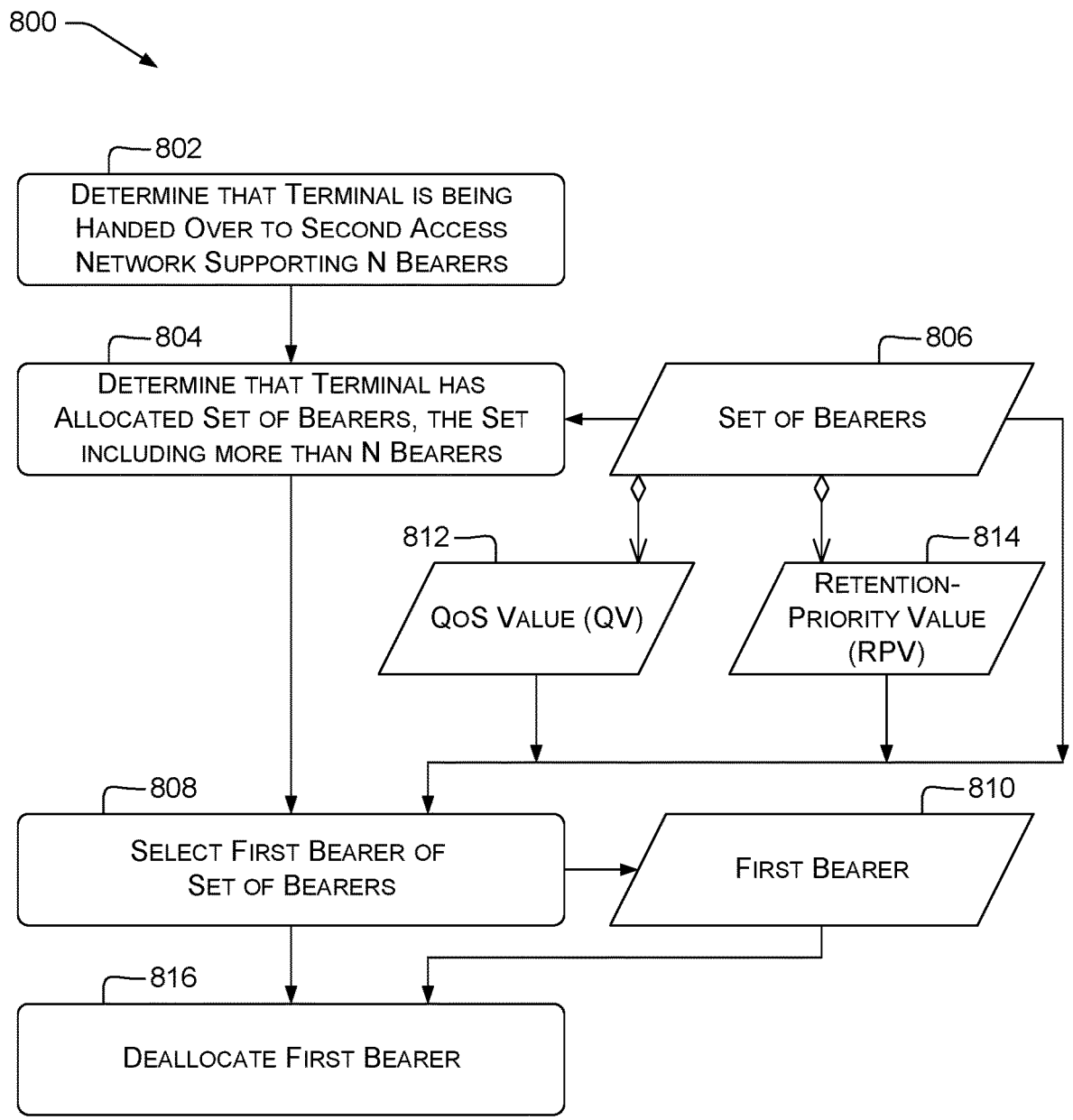
FIG. 8 illustrates an example bearer-selection and bearer-set pruning process performed at a network node, e.g., of an access network.

FIG. 8 is a dataflow diagram illustrating an example process 800 for bearer selection, and related data items. Process 800 can be performed, e.g., by servers 304 of a telecommunication system such as telecommunications network 100. The telecommunication system can include components such as those described herein with reference to process 400. In some examples, server(s) 304 include control unit(s) configured to perform operations described below, e.g., in response to computer program instructions of the bearer-selection module 326 or pruning module 328. In some examples, operations of process 800 are performed by a control unit of a network node such as second entry node 112 associated with second access network 106. In some examples, the network node comprises at least one of: an LTE eNodeB, an LTE MME, an LTE PGW, or an LTE PCRF. Process 800 can be used, e.g., to prune bearers at the time of handover, even if the bearers have not been assigned priorities or prioritized IDs 412 such as in FIG. 4.

At 802, the control unit determines that a terminal 102 is being handed over from a first access network 104 to a second access network 106. The second access network 106 supports a predetermined number ("N") of bearers per network terminal 102.

At 804, the control unit determines that the terminal 102 has allocated a set 806 of bearers comprising more bearers than the predetermined number. Set 806 can represent set 414 or 706.

At 808, the control unit selects a first bearer 810 of the set of bearers. In some examples, the first bearer comprises an LTE DRB. The control unit can select the first bearer 810 based at least in part on respective quality-of-service (QoS) values (QVs) 812 of at least some bearers of the set 806 of bearers, e.g., QCI values or other QVs 406, FIG. 4. The control unit can also select the first bearer 810 based at least in part on respective retention-priority values (RPVs) 814 of at least some bearers of the set 806 of bearers, e.g., ARP values or other RPVs 408, FIG. 4. Examples are discussed herein, e.g., with reference to blocks 410, 702, 716, or 722.

At 816, the control unit deallocates the first bearer 810. Deallocation can include terminating the first bearer 810 or session(s) carried thereby, or moving session(s) from the first bearer 810 to other bearer(s). Examples are discussed herein, e.g., with reference to FIG. 9.

In some examples, process 800 can be used with bearers given IDs 412 as discussed herein with reference to FIGS. 4 and 5. Additionally or alternatively, process 800 can be used with bearers given IDs randomly, sequentially, or in other ways. Therefore, network nodes of second access network 106 that implement process 800 can provide improved user experience during handovers, even if first access network 104 does not implement process 400 or a similar allocation technique.

FIG. 9 illustrates an example process 900 performed by server(s) 304 of a telecommunications network 100 for pruning bearers, e.g., a network node as discussed herein with reference to FIG. 6. In some examples, server(s) 304 include control unit(s) configured to perform operations described below, e.g., in response to computer program instructions of the bearer-selection module 326 or pruning module 328. In some examples, block 808 includes at least one of blocks 902-916. In some examples, block 816 includes block 920, or blocks 922 and 926.

At 902, the control unit determines a respective supplemental priority value (SPV) 904 of at least one of the bearers in the set 806 of bearers based at least in part on an access point name (APN) 906 associated with a network service being carried by the respective bearer. Examples are discussed herein, e.g., with reference to block 502.

At 908, the control unit retrieves, from a configuration network node, respective SPV(s) 904 for bearer(s) in the set 806 of bearers. For example, the control unit can query a PCRF, Policy Control Function (PCF), HSS, MME, PGW, or other node to retrieve a priority flag for a particular bearer or service being carried by that bearer. The bearer can be identified, e.g., by APN or another identifier of a corresponding PDN. In some examples, the configuration network node can store separate SPV 904 data, e.g., for each subscriber type.

At 910, the control unit selects the first bearer 810 further based at least in part on respective SPVs 904 of at least some bearers of the set 806 of bearers. Each of the SPVs 904 can include an APN, priority flag, or other value(s) of at least one of the data items described herein with reference to FIG. 4, e.g., those listed in Table 2. For example, the control unit can select, as the first bearer 810, a bearer that is not associated with a high-priority indication (priority-flag value) in the respective SPV 904. Examples of SPV-based processing are discussed herein, e.g., with reference to blocks 410 or 504. Block 910 can be used with SPV selection as discussed herein with reference to block 902, block 908, or both, in any combination. For example, at least a first SPV of the SPVs can be determined based on an APN (block 902), and at least a second SPV of the SPVs can be retrieved from a configuration network node (block 908). If the second access network 106 supports fewer bearers than the number of bearers indicated as high-priority by their respective SPVs 904, or no low-priority bearers are in use, the control unit can select the first bearer 810 from among the high-priority bearers, e.g., based on QV 812 or RPV 814.

In some examples, at block 910, the control unit determines bearer ID(s) 412 for one or more bearers in the set 806 of bearers. The control unit then selects the first bearer 810 based on the bearer ID(s) 412, e.g., as discussed herein with reference to block 702. FIGS. 4-7 describe various examples in which bearer ID(s) 412 are selected at the time of allocation and used at the time of deallocation. Block 910 can include both selecting and using bearer ID(s) 412 at the time of deallocation (blocks 808, 816). In some examples, block 910 does not include assigning the determined bearer ID(s) 412 to the bearer(s), but does include using the determined bearer ID(s) 412 in selecting the first bearer 810.

In some examples, SPV 904 includes a priority flag. At block 910, the control unit selects, as first bearer 810, a bearer that is indicated by the SPV 904 as being low priority. In some examples, the control unit selects, as first bearer 810, the bearer that is, out of all the bearer(s) indicated by the respective SPV(s) 904 as being low priority, the bearer that has the highest bearer ID 412.

At 912, the control unit determines that a first candidate bearer of the set of bearers has a first QV, a first RPV, and a first SPV. Block 912 can include selecting the first candidate bearer, or retrieving or inspecting values associated with an already-selected first candidate bearer. In some examples, the first candidate bearer can be selected randomly, or at least two bearers of the set 806 of bearers can be assigned as the first candidate bearer in turn.

At 914, the control unit determines that a second candidate bearer of the set of bearers has the first QV, the first RPV, and a second SPV different from the first SPV. As in block 912, block 914 can include selecting the second candidate bearer, e.g., as described above, or processing an existing second candidate bearer.

At 916, the control unit selects, as the first bearer, one of the first candidate bearer and the second candidate bearer based at least in part on the first SPV, the second SPV, and a predetermined comparison function 918 ("CMP") (which can represent comparison function 708). Function 918, given two SPVs, determines which of the respective bearers is to be selected before the other. Block 916 permits, e.g., using a priority flag or other SPVs 904 to break ties of QCI+ARP, or other QVs 812 or RPVs 814. For example, if only one of the first candidate bearer and the second candidate bearer has a priority flag indicating a high priority, the other of those bearers can be selected as the first bearer 810. In some examples, function 918 can be any of the functions listed in Table 3. Examples of processing at block 916 are described herein with reference to blocks 504, 508, 702, 716, or 722. For example, as noted above, block 916 can include corresponding processing described with reference to FIGS. 4-7 for both selecting bearer ID(s) 412 and using those ID(s) 412 in deallocation.

At 920, the control unit reallocates the first bearer 810 at least partly by terminating session(s) being carried by the first bearer 810. Examples are discussed herein, e.g., with reference to blocks 710 or 726.

At 922, the control unit determines that a second bearer 924 of the second access network 106 is unallocated. Examples are discussed herein, e.g., with reference to block 712. Block 922 can be followed by block 926.

At 926, the control unit move session(s) being carried by the first bearer 810 to the second bearer 924. Examples are discussed herein, e.g., with reference to block 720.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A telecommunication device, comprising: a communications interface; at least one processor; and at least one computer-readable medium storing instructions executable by the at least one processor to cause the at least one processor to perform operations comprising: receiving a request to allocate a bearer for a terminal to receive a network service via a first access network, wherein the network service is associated with a quality-of-service (QoS) value (QV) and a retention-priority value (RPV); determining a bearer identifier (ID) for the network service based at least in part on the QV, the RPV, and a supplemental priority value (SPV); and sending a reply comprising the bearer identifier via the communications interface; wherein: the SPV is different from the QV, and the SPV is different from the RPV.

B: The telecommunication device according to paragraph A, the operations further comprising: triggering a handover of the terminal from a first access network supporting a first number of bearers to a second access network supporting a second, lower number of bearers.

C: The telecommunication device according to paragraph A or B, the operations further comprising determining the SPV based at least in part on an access point name (APN) associated with the service.

D: The telecommunication device according to any of paragraphs A-C, wherein the SPV comprises at least one member selected from a first group consisting of: an APN associated with the service; a priority flag; an identification of a subscriber associated with the terminal; a type of the terminal; an equipment identifier of the terminal; a network address allocated to the terminal; a Multimedia Priority Services (MPS) indication; and a Mission-Critical Services (MCS) indication.

E: The telecommunication device according to paragraph D, wherein: the operations further comprise determining the bearer ID based at least in part on a second SPV selected from the first group; the second SPV is different from the SPV; the second SPV is different from the QV; the second SPV is different from the RPV; and the operations further comprise weighting the SPV more highly than the second SPV in determining the bearer ID.

F: At least one computer-readable medium storing computer-executable instructions that, when executed by at least one processor of a computer, configure the computer to perform acts comprising: receiving an indication of a handover of a terminal from a first access network to a second access network, the computer associated with the second access network, wherein: the first access network supports a first number of bearers for the terminal; the second access network supports a second number of bearers for the terminal; and the second number is less than the first number; and determining that the terminal has allocated a set of bearers comprising more bearers than the second number.

G: The at least one computer-readable medium according to paragraph F, the acts further comprising receiving an indication (e.g., data at registration time, e.g., from terminal, HSS, or UDR) that: the terminal supports connectivity via both the first access network and the second access network; and the terminal is operating in a single-connectivity mode (e.g., because it is an SR terminal, or because one radio is not currently being used for cellular service).

H: The at least one computer-readable medium according to paragraph F or G, the acts further comprising, in response to the determination: selecting a first bearer of the set of bearers based on: respective bearer IDs of the bearers in the set of bearers; and a predetermined comparison function that, given two bearer IDs, determines which of the two respective bearers should be terminated before the other; and terminating session(s) being carried by the first bearer.

I: The at least one computer-readable medium according to any of paragraphs F-H, the acts further comprising, in response to the determination: determining that a second bearer of the second access network is unallocated; selecting a third bearer of the set of bearers based at least in part on: respective bearer IDs of the bearers in the set of bearers; and a predetermined comparison function that, given two bearer IDs, determines which of the two corresponding bearers should be terminated before the other; and moving session(s) being carried by the third bearer to the second bearer.

J: The at least one computer-readable medium according to paragraph I, the acts further comprising, in response to the determination: selecting a fourth bearer of the set of bearers based on: respective bearer IDs of the bearers in the set of bearers; and the predetermined comparison function; and terminating session(s) being carried by the fourth bearer.

K: The at least one computer-readable medium according to paragraph J, wherein the predetermined comparison function determines that a bearer having a respective ID with a relatively higher numerical value should be terminated before a bearer having a respective ID with a relatively lower numerical value.

L: The at least one computer-readable medium according to any of paragraphs H-K, wherein the predetermined comparison function determines that a bearer having a respective ID with a relatively higher numerical value should be terminated before a bearer having a respective ID with a relatively lower numerical value.

M: A method comprising, by a control unit of a network node, performing operations comprising: determining that a terminal is being handed over from a first access network to a second access network, wherein the second access network supports a predetermined number of bearers per network terminal; determining that the terminal has allocated a set of bearers comprising more bearers than the predetermined number; selecting a first bearer of the set of bearers based at least in part on: respective quality-of-service (QoS) values (QVs) of at least some bearers of the set of bearers; and respective retention-priority values (RPVs) of at least some bearers of the set of bearers; and deallocating the first bearer.

N: The method according to paragraph M, the operations comprising deallocating the first bearer at least partly by terminating session(s) being carried by the first bearer.

O: The method according to paragraph M or N, the operations comprising deallocating the first bearer at least partly by: determining that a second bearer of the second access network is unallocated; and moving session(s) being carried by the first bearer to the second bearer.

P: The method according to any of paragraphs M-O, the operations comprising selecting the first bearer further based at least in part on respective supplemental priority values (SPVs) of at least some bearers of the set of bearers.

Q: The method according to paragraph P, the operations comprising retrieving at least one of the respective SPVs from a configuration network node.

R: The method according to paragraph P or Q, the operations comprising: determining that a first candidate bearer of the set of bearers has a first QV, a first RPV, and a first SPV; determining that a second candidate bearer of the set of bearers has the first QV, the first RPV, and a second SPV different from the first SPV; and selecting, as the first bearer, one of the first candidate bearer and the second candidate bearer based at least in part on: the first SPV; the second SPV; and a predetermined comparison function that, given two SPVs, determines which of the respective bearers is to be selected before the other.

S: The method according to any of paragraphs P-R, further comprising determining at least one of the respective SPVs based at least in part on an access point name (APN) associated with a network service being carried by the respective bearer.

T: The method according to any of paragraphs P-S, wherein the SPV comprises at least one member selected from a first group consisting of: an APN associated with the service; a priority flag; an identification of a subscriber associated with the terminal; a type of the terminal; an equipment identifier of the terminal; a network address allocated to the terminal; a Multimedia Priority Services (MPS) indication; and a Mission-Critical Services (MCS) indication.

U: The method according to any of paragraphs M-T, wherein the network node comprises at least one of: a 3GPP Long-Term Evolution (LTE) eNodeB, an LTE mobility management entity (MME), an LTE packet data network gateway (PGW), or an LTE policy charging and rules function (PCRF).

V: The method according to any of paragraphs M-U, wherein the first bearer comprises an LTE data radio bearer (DRB).

W: A system comprising: a 3GPP Long-Term Evolution (LTE) eNodeB; and the at least one computer-readable medium according to paragraph F, wherein the computer comprises the eNodeB.

X: A system comprising: a telecommunication device as recited in any of paragraphs A-E, and a control node configured to perform acts as recited in any of paragraphs F-L.

Y: A computer-readable medium, e.g., a computer storage medium, having thereon computer-executable instructions, the computer-executable instructions upon execution configuring a computer to perform operations as any of paragraphs A-E, F-L, or M-V recites.

Z: A device comprising: a processor; and a computer-readable medium, e.g., a computer storage medium, having thereon computer-executable instructions, the computer-executable instructions upon execution by the processor configuring the device to perform operations as any of paragraphs A-E, F-L, or M-V recites.

AA: A system comprising: means for processing; and means for storing having thereon computer-executable instructions, the computer-executable instructions including means to configure the system to carry out a method as any of paragraphs A-E, F-L, or M-V recites.

AB: A method comprising performing operations as any of paragraphs A-E, F-L, or M-V recites.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art.

The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. At least one computer-readable medium storing computer-executable instructions that, when executed by at least one processor of a computer, configure the computer to perform acts comprising:
   receiving an indication of a handover of a terminal from a first access network to a second access network, the computer associated with the second access network, wherein:
      the first access network supports a first number of bearers for the terminal;
      the second access network supports a second number of bearers for the terminal; and
      the second number of bearers is less than the first number of bearers; and
   determining that the terminal has allocated a set of bearers comprising more bearers than the second number of bearers;
   selecting a first bearer of the set of bearers based on:
      respective bearer IDs of the bearers in the set of bearers; and
      a predetermined comparison function that, given two bearer IDs determines which of two respective bearers corresponding to the two bearer IDs should be terminated before the other; and
   terminating at least one session being carried by the first bearer.

2. The at least one computer-readable medium according to claim 1, the acts further comprising, in response to the determination:
   determining that a second bearer of the second access network is unallocated;
   selecting a third bearer of the set of bearers based at least in part on:
      the respective bearer IDs of the bearers in the set of bearers; and
      the predetermined comparison function that determines which of two corresponding bearers should be terminated before the other; and
   moving at least one session being carried by the third bearer to the second bearer.

3. The at least one computer-readable medium according to claim 2, the acts further comprising, in response to the determination:
   selecting a fourth bearer of the set of bearers based on:
      the respective bearer IDs of the bearers in the set of bearers; and the predetermined comparison function; and
terminating at least one session being carried by the fourth bearer.

4. The at least one computer-readable medium according to claim 3, wherein the predetermined comparison function determines that a bearer having a respective ID with a relatively higher numerical value should be terminated before a bearer having a respective ID with a relatively lower numerical value.

5. The at least one computer-readable medium according to claim 1, wherein the terminal is configured to receive a network service that is associated with a quality-of-service (Qos) value (QV) and a retention-priority value (RPV).

6. The least one computer-readable medium according to claim 5, further comprising determining a bearer identifier (ID) for the network service based at least in part on the QV, the RPV, and a supplemental priority value (SPV).

7. The at least one computer-readable medium according to claim 1, wherein at least one of the first access network or the second access network is associated with a gNodeB.

8. The at least one computer-readable medium according to claim 1, wherein at least one of the first access network or the second access network is associated with a eNodeB.

9. A telecommunication device, comprising:
a communications interface;
at least one processor; and
at least one computer-readable medium storing instructions executable by the at least one processor to cause the at least one processor to perform operations comprising:
receiving an indication of a handover of a terminal from a first access network to a second access network, wherein:
the first access network supports a first number of bearers for the terminal;
the second access network supports a second number of bearers for the terminal; and
the second number of bearers is less than the first number of bearers; and
determining that the terminal has allocated a set of bearers comprising more bearers than the second number of bearers;
selecting a first bearer of the set of bearers based on:
respective bearer IDs of the bearers in the set of bearers; and
a predetermined comparison function that, given two bearer IDs, determines which of two respective bearers corresponding to the two bearer IDs should be terminated before the other; and
terminating at least one session being carried by the first bearer.

10. The telecommunication device according to claim 9, the operations further comprising, in response to the determination:
determining that a second bearer of the second access network is unallocated;
selecting a third bearer of the set of bearers based at least in part on:
the respective bearer IDs of the bearers in the set of bearers; and
predetermined comparison function that determines which of two corresponding bearers should be terminated before the other; and
moving at least one session being carried by the third bearer to the second bearer.

11. The telecommunication device according to claim 10, the operations further comprising, in response to the determination:
selecting a fourth bearer of the set of bearers based on:
the respective bearer IDs of the bearers in the set of bearers; and
the predetermined comparison function; and
terminating at least one session being carried by the fourth bearer.

12. The telecommunication device according to claim 11, wherein the predetermined comparison function determines that a bearer having a respective ID with a relatively higher numerical value should be terminated before a bearer having a respective ID with a relatively lower numerical value.

13. The telecommunication device according to claim 9, wherein the terminal is configured to receive a network service that is associated with a quality-of-service (QOS) value (QV) and a retention-priority value (RPV).

14. The telecommunication device according to claim 13, the operations further comprising determining a bearer identifier (ID) for the network service based at least in part on the QV, the RPV, and a supplemental priority value (SPV).

15. A method comprising, by a control unit of a network node, performing operations comprising:
receiving an indication of a handover of a terminal from a first access network to a second access network, the network node associated with the second access network, wherein:
the first access network supports a first number of bearers for the terminal;
the second access network supports a second number of bearers for the terminal; and
the second number of bearers is less than the first number of bearers;
determining that the terminal has allocated a set of bearers comprising more bearers than the second number of bearers; and
in response to the determination:
determining that a first bearer of the second access network is unallocated;
selecting a second bearer of the set of bearers based at least in part on:
respective bearer IDs of the bearers in the set of bearers; and
a predetermined comparison function that, given two bearer IDs, determines which of two corresponding bearers corresponding to the two bearer IDs should be terminated before the other; and
moving at least one session being carried by the second bearer to the first bearer.

16. The method according to claim 15, the operations further comprising, in response to the determination:
selecting a third bearer of the set of bearers based on:
the respective bearer IDs of the bearers in the set of bearers; and
the predetermined comparison function that, given two bearer IDs, determines which of the two respective bearers should be terminated before the other; and
terminating at least one session being carried by the third bearer.

17. The method according to claim 16, the operations further comprising, in response to the determination:
selecting a fourth bearer of the set of bearers based on:
the respective bearer IDs of the bearers in the set of bearers; and
the predetermined comparison function; and terminating at least one session being carried by the fourth bearer.

18. The method according to claim 17, wherein the predetermined comparison function determines that a bearer having a respective ID with a relatively higher numerical value should be terminated before a bearer having a respective ID with a relatively lower numerical value.

19. The method according to claim 15, wherein the terminal is configured to receive a network service that is associated with a quality-of-service (QOS) value (QV) and a retention-priority value (RPV).

20. The method according to claim 19, further comprising determining a bearer identifier (ID) for the network service based at least in part on the QV, the RPV, and a supplemental priority value (SPV).

* * * * *